United States Patent
Huang et al.

(10) Patent No.: US 6,241,435 B1
(45) Date of Patent: Jun. 5, 2001

(54) UNIVERSAL ADAPTIVE MACHINING CHATTER CONTROL FIXTURE

(75) Inventors: Chien Y. Huang, Great Neck; William C. Van Nostrand, Ronkonkoma; Edwin G. Haas, Sayville, all of NY (US)

(73) Assignee: Vought Aircraft Industries, Inc., Dallas, TX (US)

( * ) Notice: Subject to any disclaimer, the term of this patent is extended or adjusted under 35 U.S.C. 154(b) by 0 days.

(21) Appl. No.: 09/048,403

(22) Filed: Mar. 25, 1998

(51) Int. Cl.[7] ............... B23C 9/00; G05B 13/02; B24B 49/00
(52) U.S. Cl. ............. 409/141; 318/575; 409/131; 451/11; 700/177
(58) Field of Search ................. 29/56.5; 409/80, 409/131, 132, 141, 10; 82/158; 451/10, 9, 5, 11; 408/6, 143; 318/575, 571, 632, 649, 611; 364/474.19, 474.01; 269/305; 700/177

(56) References Cited

U.S. PATENT DOCUMENTS

| | | | |
|---|---|---|---|
| 3,576,979 | * 5/1971 | McCall et al. | 318/569 |
| 3,665,493 | * 5/1972 | Glowzewski et al. | 318/566 Y |
| 3,671,840 | 6/1972 | Meyer et al. | 318/571 |
| 3,754,487 | 8/1973 | Nachtigal | 82/1 C |
| 3,809,488 | * 5/1974 | Sonderegger | 409/6 |
| 3,849,712 | 11/1974 | Lankford et al. | 318/561 |
| 3,967,515 | 7/1976 | Nachtigal et al. | 82/2 B |
| 4,354,404 | 10/1982 | Ramusino | 82/2 D |
| 4,530,626 | * 7/1985 | Sabbioni | 409/10 |
| 4,976,415 | 12/1990 | Murai et al. | 267/136 |
| 5,133,527 | 7/1992 | Chen et al. | 248/550 |
| 5,153,490 | * 10/1992 | Ueta et al. | 318/571 |
| 5,170,358 | * 12/1992 | Delio | 364/474.19 |
| 5,387,061 | * 2/1995 | Barkman et al. | 409/80 |
| 5,432,422 | * 7/1995 | Nagano et al. | 318/611 |
| 5,512,808 | * 4/1996 | Clark, Jr. et al. | 318/575 |
| 5,549,190 | * 8/1996 | Turchan | 269/305 X |
| 5,558,557 | * 9/1996 | Dashevsky | 451/10 |
| 5,566,092 | * 10/1996 | Wang et al. | 364/474.01 X |
| 5,568,032 | * 10/1996 | Wakvi | 318/632 |
| 5,584,744 | * 12/1996 | Shirai et al. | 451/5 |
| 5,742,145 | * 4/1998 | Kitorrami | 318/632 |
| 5,750,897 | * 5/1998 | Kato | 318/649 X |

FOREIGN PATENT DOCUMENTS

| | | | |
|---|---|---|---|
| 188214 | * 7/1989 | (JP) | 409/141 |
| 257547 | * 10/1989 | (JP) | 409/141 |
| 279242 | * 11/1990 | (JP) | 409/141 |

* cited by examiner

Primary Examiner—William Briggs
(74) Attorney, Agent, or Firm—Perman & Green, LLP

(57) ABSTRACT

A method for automatically minimizing an undesirable motion of a workpiece during a machining operation, and a universal adaptive machining chatter control fixture that operates in accordance with the method. The method comprises the steps of mounting the workpiece to an active, supporting structure, and then machining the workpiece. During the step of machining, an undesirable motion of the workpiece is sensed in the supporting structure. Thereafter, a compensating motion is applied to the supporting structure for minimizing the undesirable motion of the workpiece. The chatter control fixture can be attached to various types of machine tool devices, without requiring that the machine tool devices be retrofitted, and operates to minimize undesirable motions of the workpiece independently of the machine tool devices.

23 Claims, 9 Drawing Sheets

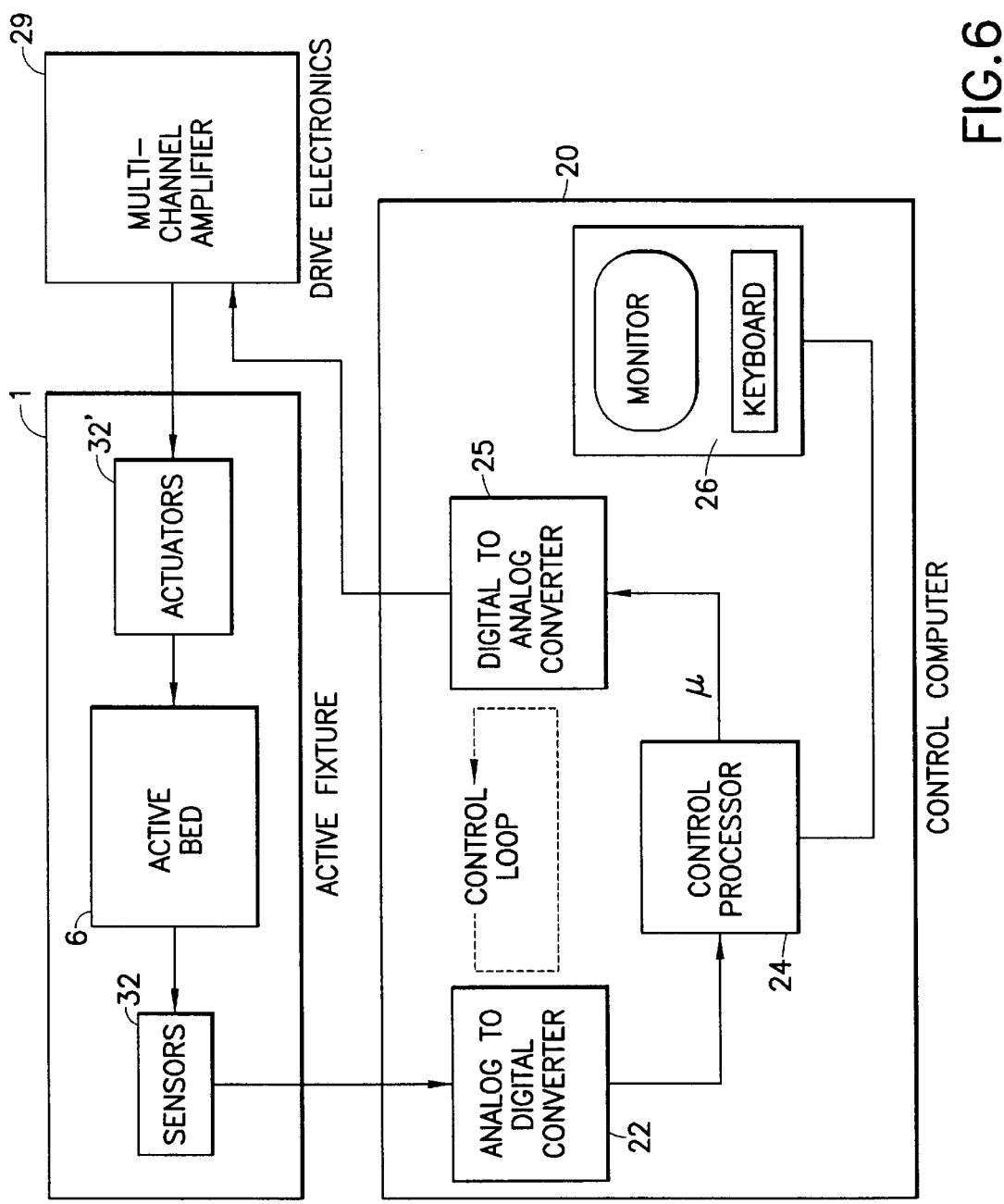

UNIVERSAL ADAPTIVE MACHINING CHATTER CONTROL FIXTURE

FIELD OF THE INVENTION

This invention relates generally to vibrational chatter reduction devices usable in machining operations and, in particular, to a universal adaptive machining chatter control fixture.

BACKGROUND OF THE INVENTION

It is generally recognized in the machining industry that problems relating to excessive vibrations, or "chatter", are among the major factors limiting machining productivity and surface finish quality of a machined workpiece. Chatter is caused by vibrations produced when the cutter of a machining or cutting system, given a particular rotating speed and feed rate, excites a resonance frequency in the system and workpiece. Vibrations are inherent in the machining process and can affect the surface finish of the workpiece. Excessive vibrations limit machining precision, and can be very destructive to a cutting tool and/or a workpiece.

The potential for workpiece chatter depends, at least in part, upon the hardness of the workpiece material. With the increased usage of hard materials such as super alloys, refractory alloys, and many of the titanium alloys, chatter has become a significant problem. The machining of these materials requires much machine operator attention and special care. The machinist must anticipate the possibility for chatter in a set-up phase and attempt to reduce chatter onset as much as possible by applying rigid fixturing. Beyond this procedure, there are a paucity of commercially available means for reducing chatter. Moreover, in practice it often occurs that by the time the machinist hears audible chatter and responds to it, damage may have already occurred in the form of excessive cutter wear (with an associated loss of tolerance of the machined surface due to a worn or broken cutter), poor or unacceptable workpiece surface finish, and increased wear of machine tool bearings and components. Additionally, high-pitched sounds associated with chatter can be annoying and possibly harmful to the operator.

Methods that are presently known in the art for controlling chatter are based upon procedures for controlling the machining process. Automatic chatter control systems which, by example, adjust machining parameters such as spindle (cutter) speed and/or feed rates have been employed to control chatter. Such systems, however, must be designed specifically for, and built into, the particular machine tool of interest.

U.S. Pat. No. 3,671,840, issued to Meyer et al., discloses an adaptive control for a turning machine. Vibrations of a tool or workpiece during a machining operation are measured to produce signals corresponding to actual vibrations in mutually perpendicular directions. The vibration signals are compared with signals corresponding to reference magnitudes in both directions. The results of the comparisons are used to correct feeding of the tool or workpiece in accordance with the comparison results.

U.S. Pat. No. 3,967,515, issued to Nachtigal et al., discloses an apparatus for controlling vibrational chatter in a machine tool utilizing a synthesis circuit that updates workpiece and machine tool positions. A cutting tool mounted on a machine structure is moved into contact with a workpiece which is mounted on the machine structure. A resultant cutting force is reflected back through the tool and machine structure and is then measured by a transducer, which generates a signal indicative thereof. This force signal is applied to the synthesis circuit for continuous calculation of the workpiece displacement in accordance with continuously updated static and dynamic characteristics of the machine structure and the workpiece. Simultaneously, an accelerometer detects the acceleration of one of the cutting tool and workpiece. A signal representative of actual horizontal acceleration of the tool into or away from the workpiece is used to derive a signal representing a corresponding actual horizontal displacement of the tool. An output signal of the synthesis circuit is compared with the horizontal displacement signal. When the two signals are not equal, the difference is used to generate an error signal for controlling a compensatory force actuator that is mounted on the machine structure. The compensatory force actuator comprises a bidirectional, force-delivering assembly having a housing containing a force actuator. The compensatory force actuator mechanically applies compensatory forces to the machine structure to supplement the applied cutting force and thereby adjust the tool displacement to offset and eliminate vibrational chatter.

Another method that is known in the art for controlling chatter is based upon manual control of the machining process. By example, manually operated machines rely upon the machine tool operator to alter the machining parameters once chatter occurs. Cutter speed and feed rates are the two most common parameters that the machinist adjusts when attempting to eliminate chatter. Traditionally, while initially setting up the machine tool assembly, the operator sets the cutter speed, depth and width of cut, and workpiece feed rate for a particular machining pass based upon the operator's experience and finished part requirements. Thereafter, during the machining process, the operator must stop the machine and adjust the feed rate and/or the spindle speed, or remove less material per machining pass in order to reduce chatter. Unfortunately, the need for constant operator vigilance and the time required for the operator to make such parameter adjustments slows the machining process. Moreover, although the chatter is likely to be reduced after the operator has made such parameter adjustments, damage may have already occurred to the workpiece and/or machining tool owing to the chatter that occurred before the operator intervention.

It can be appreciated that chatter reduces the efficiency of the machining process and reduces the quality of workmanship attained. A reduction of chatter in machining processes thus provides for increased machining efficiency and reductions in machining costs.

OBJECTS OF THE INVENTION

It is a first object of this invention to provide a means for performing an automatic, real-time control of machining chatter without the need for operator intervention.

It is a second object of this invention to provide an adaptive machining chatter control fixture that improves machining precision and repeatability and reduces machine tool wear.

It is a third object of this invention to provide an adaptive machining chatter control fixture that enables faster machining to be performed through increased workpiece feed and removal rates.

It is a fourth object of this invention to provide an adaptive machining chatter control fixture that can be mounted or retrofitted to the bed of any machine tool and is independent of the machine tool's existing controller.

It is another object of this invention to provide a means for adaptively controlling machining chatter while accounting for dynamic machining conditions, including changes in the shape and weight of a workpiece being machined.

It is a further object of this invention to provide a means for monitoring chatter-induced translational and rotational motions of a workpiece in a plurality of directions during a machining operation, and for minimizing the chatter by moving the workpiece in directions based upon the monitored motions.

Further objects and advantages of this invention will become apparent from a consideration of the drawings and ensuing description.

SUMMARY OF THE INVENTION

The foregoing and other problems are overcome and the objects of the invention are realized by a method for automatically minimizing an undesirable motion of a workpiece during a machining operation, and by a universal adaptive machining chatter control fixture that operates in accordance with the method. The method comprises the steps of mounting the workpiece to a supporting structure or fixture, and then machining the workpiece. During the step of machining, an undesirable motion of the workpiece is sensed in the supporting fixture. Thereafter, a compensating motion is generated and applied to the supporting fixture for minimizing the undesirable motion of the workpiece.

The step of sensing may be performed by detecting at least one of accelerations of the workpiece and supporting fixture along the x, y, and z axes, and acoustic vibrations produced as a result of the undesirable motion of the workpiece.

In accordance with one embodiment of the invention, the detection of the workpiece and supporting fixture accelerations may be accomplished by employing a single, tri-axial accelerometer for detecting accelerations along each of the x, y, and z axes, simultaneously. In accordance with another embodiment of the invention, the detection of the workpiece and supporting structure accelerations may be accomplished by employing three single-axial accelerometers, each of which individually detects accelerations along a respective one of the x, y, and z axes.

The method of the invention is performed on a real-time basis and as dynamic changes occur to physical characteristics (e.g., shape, weight) of the workpiece resulting from the machining of the workpiece. In cases in which acoustic sensors are provided on the supporting fixture, the method is preferably performed to detect and minimize chatter-induced acoustic vibrations before they reach a level at which they become audible.

Also in accordance with the method of the invention, in response to sensing the undesirable motion of the workpiece, a signal which corresponds to the undesirable motion of the workpiece is produced. The step of generating includes a step of comparing the signal with a reference signal to produce an error signal. Thereafter, the compensating motion is generated and applied to the supporting fixture so as to minimize a magnitude of the error signal.

The method of the invention may employ any suitable adaptive control scheme for minimizing the undesirable motions of the supporting fixture including, by example, a direct adaptive control scheme or an indirect adaptive control scheme.

The supporting fixture is preferably adaptive for coupling to different types of machining structures. That is, in accordance with the invention, the supporting fixture preferably can be mounted to, and retrofitted on, a machine bed of any type of machine tool structure. The above-described method for minimizing the undesirable motion in the workpiece is performed by the components of the invention independently of a controller of the machine tool structure.

BRIEF DESCRIPTION OF THE DRAWINGS

The above set forth and other features of the invention are made more apparent in the ensuing Detailed Description of the Invention when read in conjunction with the attached Drawings, wherein:

FIG. 6 is a block diagram of an active fixture having a control computer and a multi-channel amplifier connected in accordance with this invention.

Identically labeled elements appearing in different ones of the figures refer to the same element but may not be referenced in the description for all figures.

DETAILED DESCRIPTION OF THE INVENTION

Figure 1:
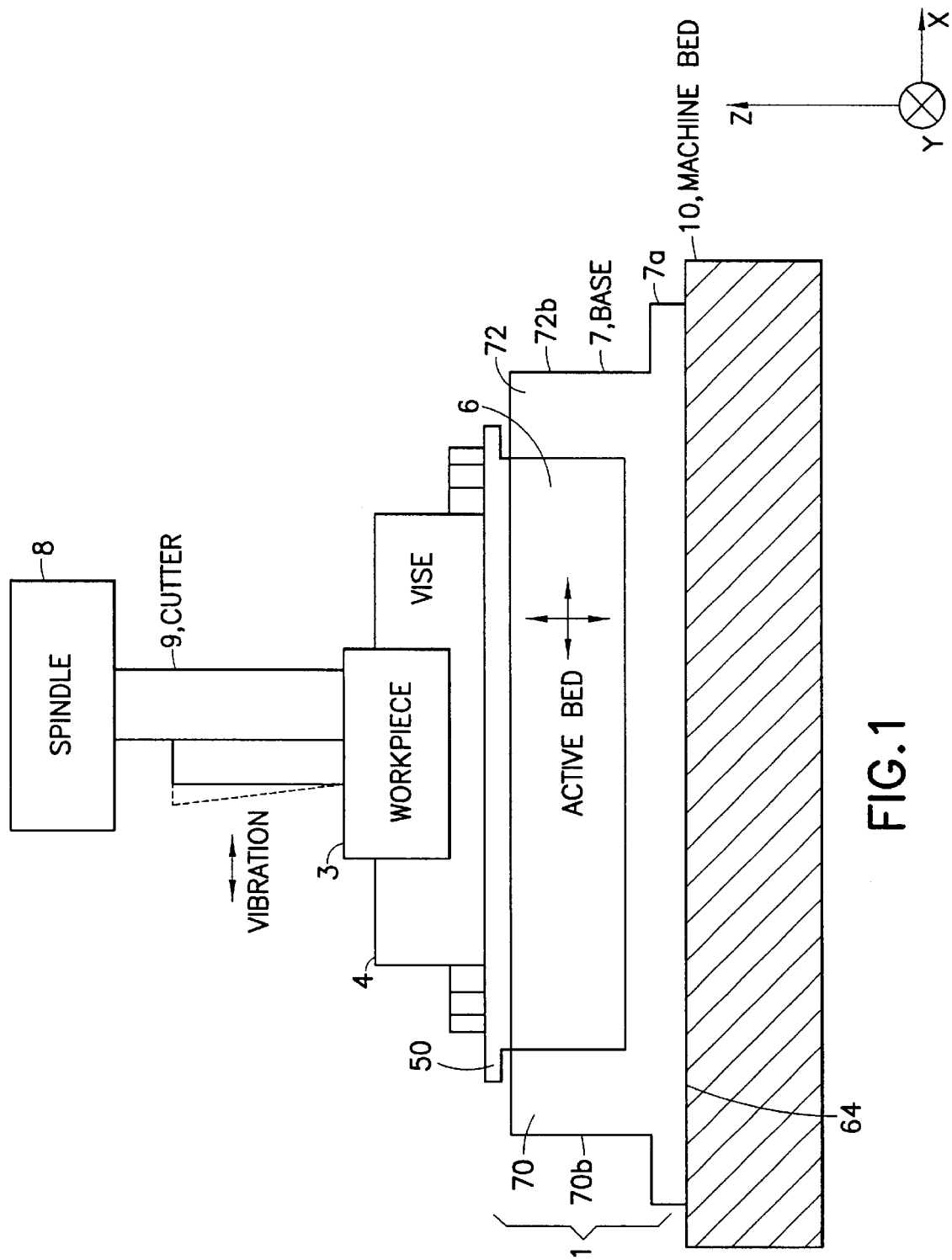
FIG. 1 is a cross sectional view of an active fixture constructed in accordance with this invention and provided in a typical machining system.

FIG. 1 illustrates a cross-sectional view of a universal adaptive machining chatter control fixture (hereinafter referred to as an "active fixture") 1 that is constructed in accordance with this invention. The active fixture 1 comprises a base 7 and an active bed 6 (also referred to as a "supporting fixture" or "supporting structure"). A machine bed 10, vise 4, workpiece 3, spindle 8, and cutter 9 are also shown in FIG. 1 for reference purposes only, and are not considered to be part of the invention per se. In FIG. 1, the active fixture 1 is secured to the machine bed 10 of, by example, a milling machine via through bolts (not illustrated in FIG. 1), and the vise 4 is bolted to a top surface 50 of the active bed 6. The vise 4 holds the workpiece 3 in place. It should be noted that the use of the vise 4 for holding the workpiece 3 in place is optional, and the vise 4 is shown in FIG. 1 for illustrative purposes only. By example, the workpiece 3 may be affixed to the active bed 6 directly, using another suitable clamping mechanism. Also, although the invention is described herein as being employed with a milling machine, it is not intended that the invention be so limited; that is, the invention may be employed in other types of machining systems.

The active fixture 1 may be installed on virtually any milling machine. The size of active bed 6 can be scaled accordingly to fit machine tools having various machine bed sizes. When attached to a milling machine, the active bed 6 has a similar appearance to a machine bed of the milling machine. The active fixture 1 is a self-contained system which can be implemented without modifying existing machines, thereby enabling easy retrofit and universal adaption to machine beds, generally. The active fixture 1 can operate efficiently and reliably in harsh machining environments, is easily and quickly cleanable, needs no adjustments, and requires minimal maintenance.

Figure 2:
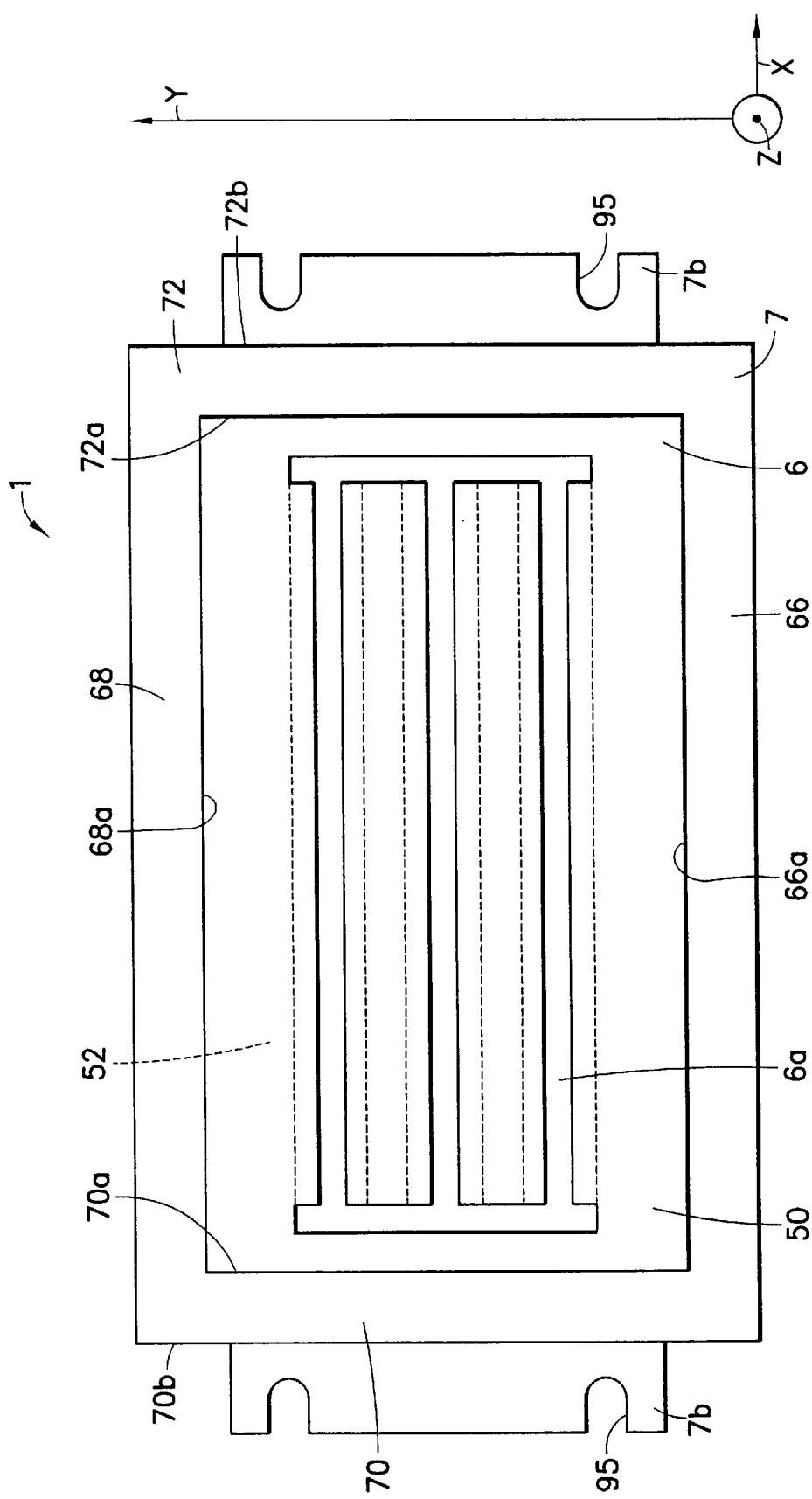
FIG. 2 illustrates a top view of the active fixture of FIG. 1, showing standard mounting T-slots.
Figure 3:
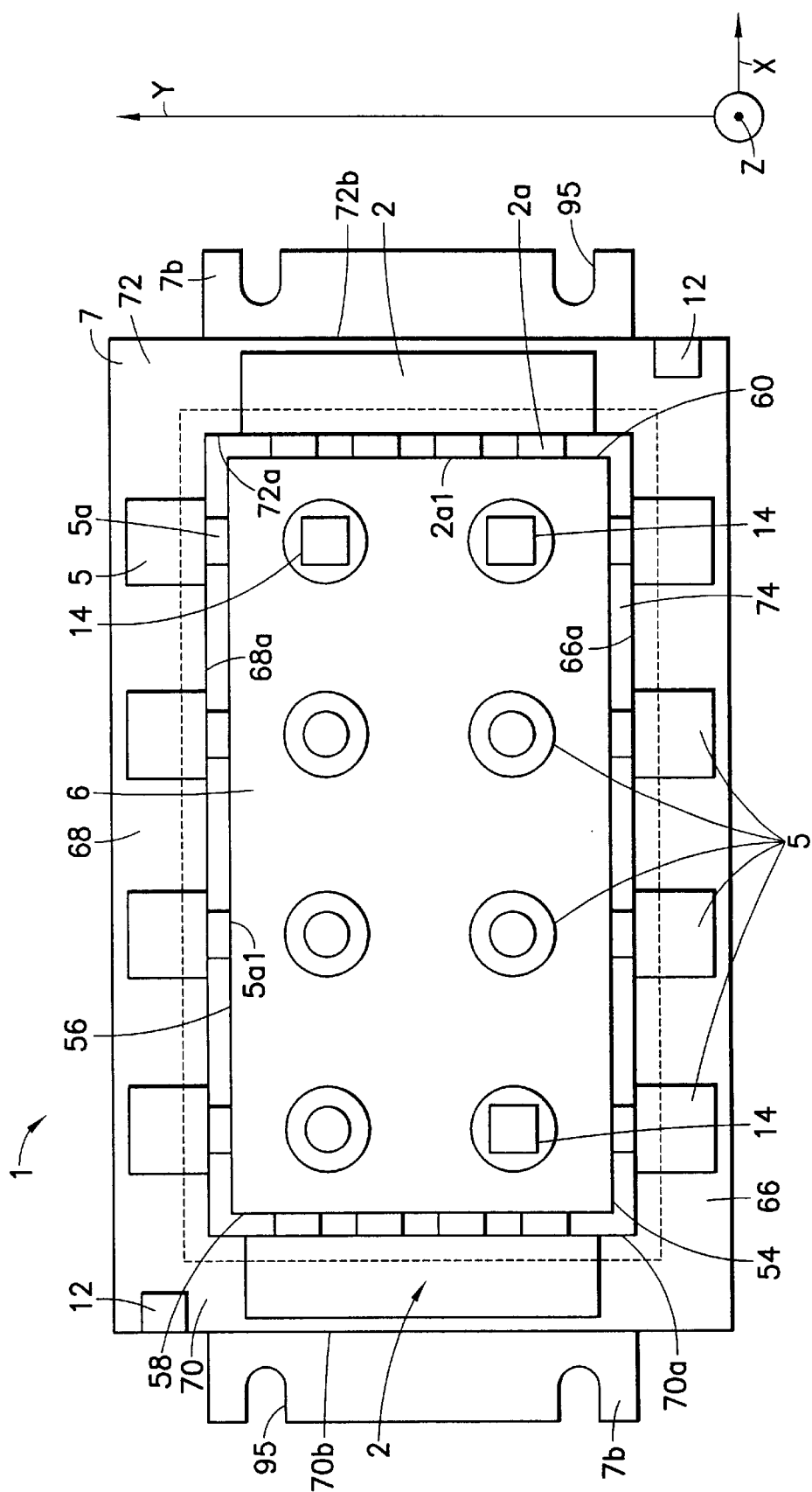
FIG. 3 illustrates a top view of the active fixture of FIG. 1, with the top surface removed, showing acoustic sensors, actuators, actuator assemblies, and accelerometers.
Figure 4:
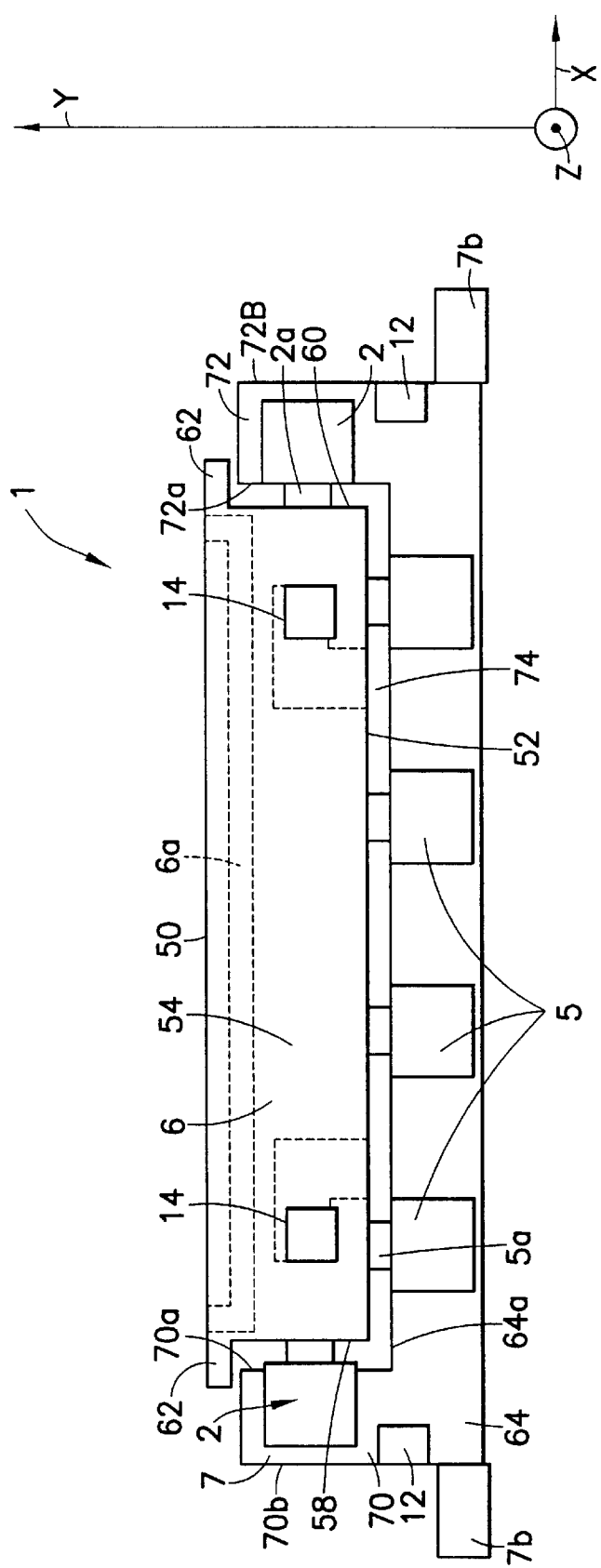
FIG. 4 illustrates a side view of the active fixture of FIG. 1.

Referring to FIGS. 2–4, in a preferred embodiment of the invention the active bed 6 has six main surfaces: the top surface 50, a bottom surface 52, a first side surface 54, a second side surface 56, a third side surface 58, and a fourth side surface 60. These various surfaces enclose a volume of the active bed 6 within which are mounted various components, as described below.

As is shown in FIG. 2, the top plate or surface 50 comprises T-slots 6a for attaching devices such as, for example, vises or clamps. The top surface 50 serves as a working area that is very similar to that of, for example, a typical machine bed. The top surface 50 extends perpendicularly beyond the plane of each of the side surfaces 54, 56, 58, 60 of the active bed 6, forming peripheral edges (each peripheral edge is denoted in FIG. 4 as "62").

Within the active bed 6 are housed a plurality of accelerometers 14 for monitoring accelerations of the active fixture 1 (including accelerations of the workpiece 3 mounted thereon) resulting at least from any vibrational chatter occurring during the machining process. The accelerations sensed by the accelerometers are used by a control computer 20 (FIG. 6) to derive a position of the active bed 6 (and workpiece 3) in order to determine control parameters that are used to compensate for chatter, as will be described below. The accelerometers 14 are housed inside of the active bed 6 in a manner such that they do not interfere with machining operations.

In accordance with one embodiment of the invention, there are three accelerometers 14 housed within the active bed 6. Each accelerometer 14 is located near a respective corner of the active bed 6, and is single-axial; that is, each accelerometer 14 measures accelerations along a respective one of three mutually perpendicular axes (e.g., X, Y, and Z). For this embodiment, the selection of which one of the accelerometers 14 is located at a particular corner of the active bed 6, and the selection of which ones of the active bed corners an accelerometer is located near, is not of particular concern to the invention, so long as the accelerometers 14 employed collectively measure accelerations occurring along the axes (X, Y, and Z).

In accordance with another embodiment of the invention, only a single, tri-axial accelerometer is employed which measures accelerations occurring along each of the axes (X, Y, and Z) simultaneously. In this embodiment, the single accelerometer may be housed within the active bed 6 near a selected one of the corners. It should be noted that other types of sensors may be employed in conjunction with, or in lieu of, the accelerometers 14, such as, for example, velocity and/or attitude sensors, and that the placement of the sensors may be modified (e.g., away from the corners) without changing the spirit of the invention.

Figure 10:
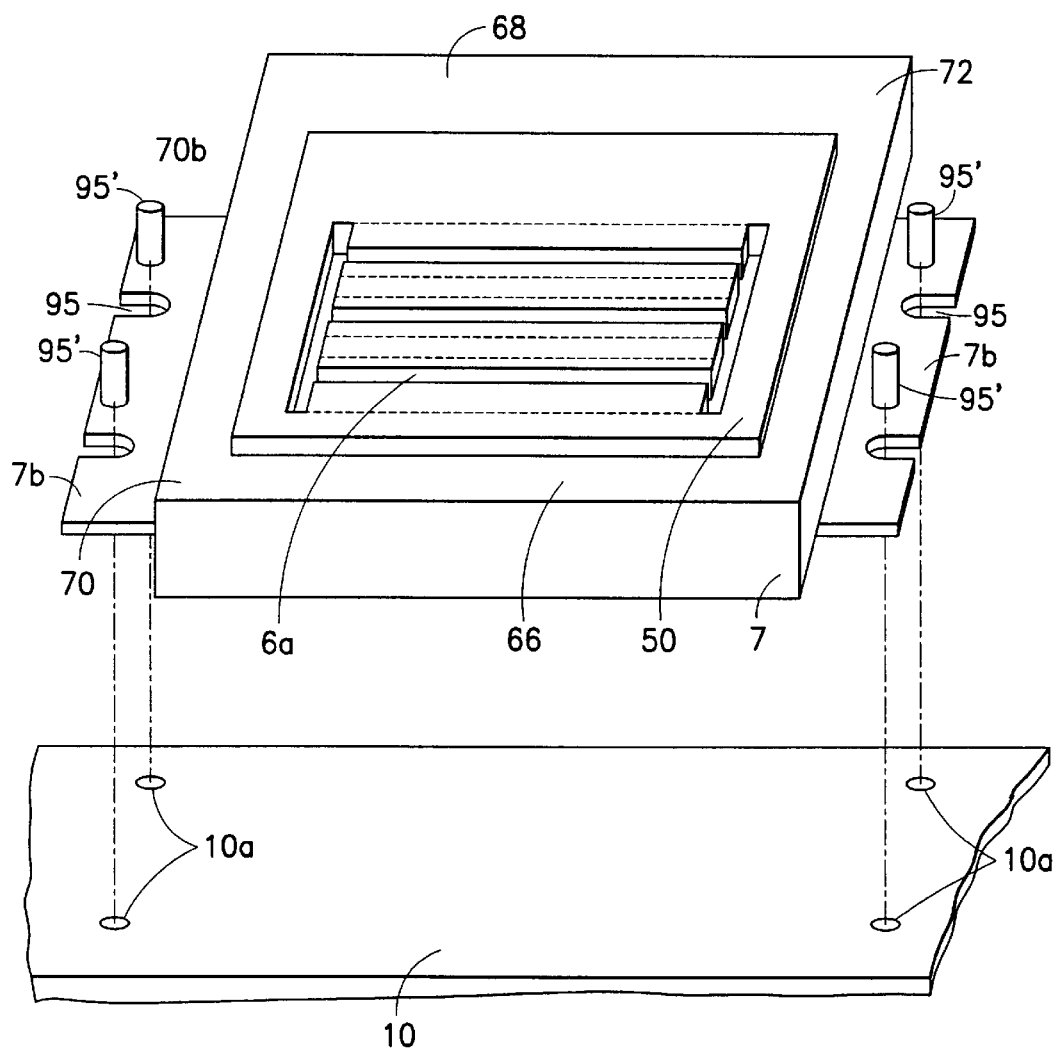
FIG. 10 shows a perspective view of the active fixture of FIG. 1 and through bolts for securing the active fixture to a machine bed of the machining system of FIG. 1.

Referring to FIGS. 1, 3, and 4, the base 7 comprises a bottom member 64 and four walls 66, 68, 70, 72. Each of the walls 66, 68, 70, 72 extends in one direction from a top surface 64a of the bottom member 64. Each of the walls 66, 68, 70, 72 of the base 7 has a respective inner surface 66a, 68a, 70a, 72a. The inner surfaces 66a, 68a, 70a, 72a of the four walls 66, 68, 70, 72, and the top surface 64a of the bottom member 64, bound an inner bed area 74 (FIG. 4) which is large enough to house the active bed 6. Base extensions 7b extend from, and are substantially normal to, portions of respective outer surfaces 70b, 72b of base walls 70 and 72, respectively. These extensions 7b may have holes (not shown) or slots machined as shown in FIGS. 2 and 3 to assist in securing the active fixture 1 to the machine bed 10. That is, in accordance with a preferred embodiment of the invention the base extensions 7b include slots 95 that are suitably sized for receiving through bolts 95' (which engage with slots 10a in machine bed 10) for enabling the base 7, and hence, the active fixture 1, to be secured to the machine bed 10 (i.e., to a machine bed of any milling machine), as can be appreciated in view of FIG. 10. These slots 95 may be embodied as grooved slots as shown in FIGS. 2, 3 and 10, or may also be embodied as, for example, hole openings through the base extensions 7b.

In the preferred embodiment of the invention, on the base 7 are mounted at least one acoustic sensor 12, and preferably a plurality of such acoustic sensors. The acoustic sensors 12 monitor for acoustic vibrations induced by chatter occurring during the milling process, and are employed to facilitate the monitoring performed by the accelerometers 14, as will be described below. According to a preferred embodiment of the invention, there are two acoustic sensors 12 mounted at opposite corners of the base 7 on opposing walls 70 and 72. As shown in FIG. 3, by example, a first acoustic sensor 12 is mounted at one end of wall 70 and a second acoustic sensor 12 is mounted at an opposing end of wall 72 such that the two acoustic sensors 12 diagonally oppose one another. It should be noted that the acoustic sensors 12 may also be employed in the invention in lieu of the accelerometers 14, or vice versa.

The base 7 houses a plurality of force actuators 5, the number of which depends upon the size of the active fixture 1 to be affixed to a machine tool bed in a particular application. Referring to FIG. 3 and FIG. 4, a top view of an exemplary active fixture 1 with top surface 50 removed, and a side view of the active fixture 1, are illustrated, respectively. There are four actuators 5 housed within each of the walls 66 and 68, eight actuators 5 housed within the bottom member 64, and individual actuator assemblies 2 housed within each of the other walls 70 and 72 of the base 7. The actuator assemblies 2 comprise actuators 5.

The actuators 5 and actuator assemblies 2 collectively provide forces along the x,y,z coordinate system sensed by the accelerometers 14 under the control of a control computer module 20, as will be described below. The actuators 5 and actuator assemblies 2 can simultaneously impart low-amplitude forces along the three axes of the coordinate system to compensate for evolving motion dynamics in real-time. The actuators 5 and actuator assemblies 2 can be any suitable device known in the art for providing a directional force in response to, and in a manner that depends upon, an applied electrical signal. Preferably, the actuators 5 and the actuator assemblies 2 have sizes which permit them to be housed in the active fixture base 7, and which enable the devices to exert sufficient forces for moving the active bed 6 in a manner that is controlled by the control computer module 20. The actuators 5 and actuator assemblies 2 may comprise, by example, a piezo-electric ceramic material or TERFENOL-D, and may include linear actuators for exerting forces in predetermined directions.

Each actuator 5 has a portion 5a which protrudes through an opening of the respective surface 66a, 68a, 64a of the wall 66, 68, or bottom member 64, within which the actuator 5 is housed, in a direction that is towards the inner bed area 74 and substantially normal to the plane of the respective surface 66a, 68a, 64a. Similarly, portions 2a of each actuator assembly 2 protrude through openings of the respective inner surfaces 70a, 72a of the walls 70, 72 within which the actuator assembly 2 is housed, in a direction that is towards the inner bed area 74 and substantially normal to the plane of the respective inner surface 70a, 72a. For the purposes of this description, the respective protruding portions 5a, 2a of the respective actuators 5 and actuator assemblies 2, are designated as actuator protrusions 5a and actuator assembly protrusions 2a, respectively.

Each of the actuator protrusions 5a and actuator assembly protrusions 2a has a contacting edge surface 5a1, 2a1, respectively. Each of the actuator protrusions 5a and actuator assembly protrusions 2a is situated within the inner bed area 74 such that the plane of its contacting edge surface 5a1, 2a1 is substantially parallel to the plane of the respective inner surface 66a, 68a, 70a, 72a, or top surface 64a, of the wall 66, 68, 70, 72, or bottom member 64, respectively, within which the actuator 5 or actuator assembly 2 is housed. As such, the contacting edge surfaces 5a1, 2a1 of the actuator protrusions 5a and actuator assembly protrusions 2a form a movable "seat" upon which the active bed 6 is supported and secured within the inner bed area 74. More particularly, contacting edge surfaces 5a1 of the actuator protrusions 5a that protrude from walls 66 and 68 and the bottom member 64 of the base 7, abut the first side surface 54, the second side surface 56, and the bottom surface 52, respectively, of the active bed 6. Similarly, contacting edge surfaces 2a1 of the actuator assembly protrusions 2a protruding from walls 70 and 72 of the base 7 abut the third side surface 58 and the fourth side surface 60, respectively, of the active fixture 6. In this manner, the active bed 6 is seated on the actuator and actuator assembly protrusions 5a, 2a such that the peripheral edges 62 of the active bed 6 extend from the active bed 6 in a direction that is substantially normal to, and to a distance that extends beyond, the planes of the inner surfaces 66a, 68a, 70, 72a of the walls 66, 68, 70, 72 of the base 7. As such, during a machining operation any cutting oil, chips, and other debris created during machining of the workpiece 3 are prevented from falling within the inner bed area 74 of the base 7, thereby preventing such debris from damaging and/or affecting the performance of the actuators 5 and/or actuator assemblies 2. The actuators 5 and actuator assemblies 2 are controllable for exerting forces against the respective active bed surfaces 54, 56, 52, 58 and 60 in small-amplitude movements (and in predetermined directions), which obviate the need for any complex gimbal mounts for each actuator. These actuators adjust the position of the active bed 5 in a controlled manner, as will be described below.

Figure 5A:
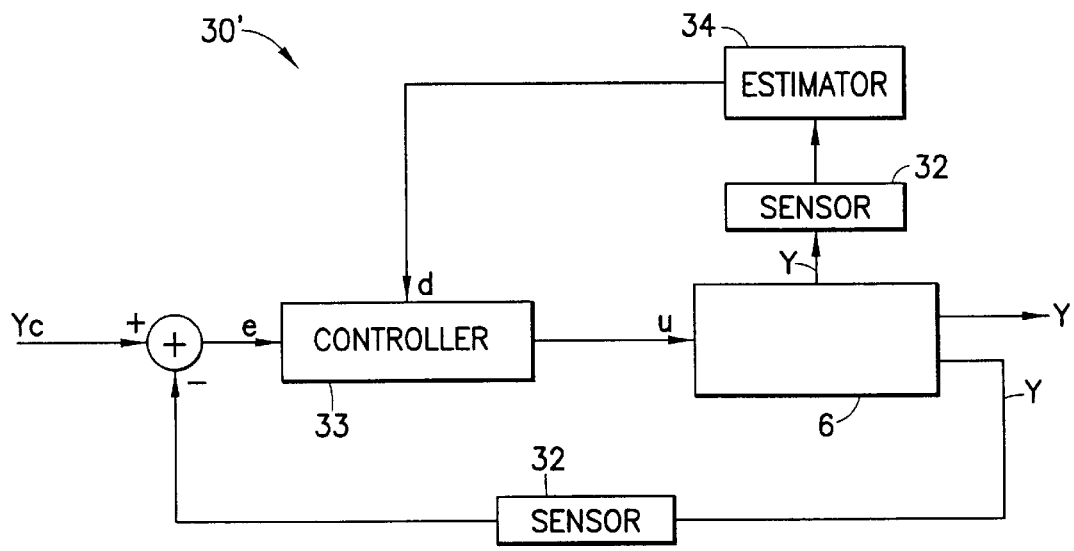
FIG. 5a is a block diagram of an active fixture direct adaptive control system constructed in accordance with this invention.
Figure 5B:
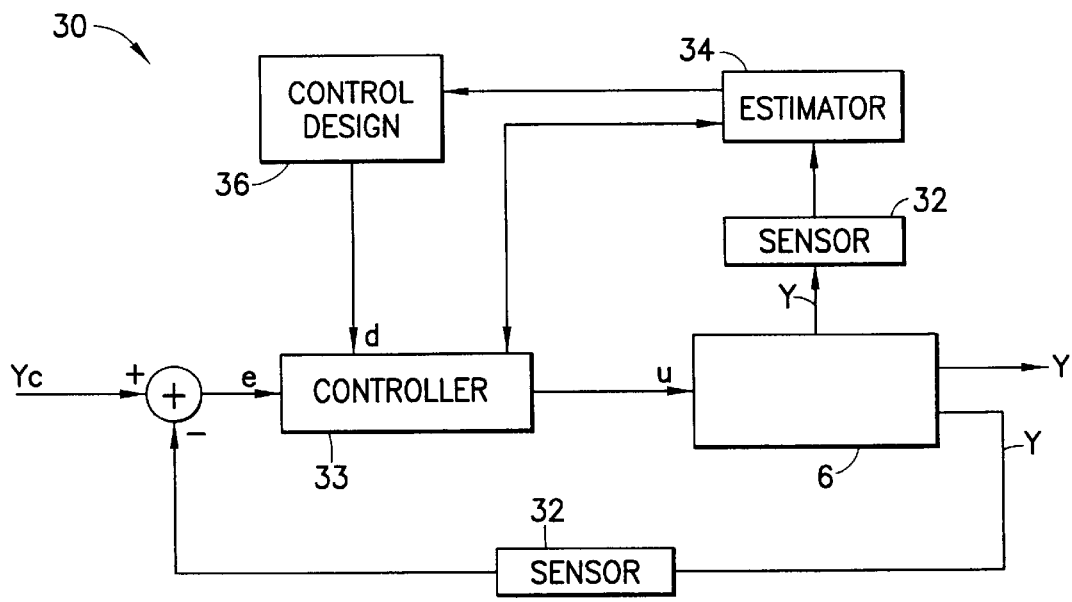
FIG. 5b is a block diagram of an active fixture indirect adaptive control system constructed in accordance with this invention.

In accordance with an aspect of the invention, a control scheme is employed by the active fixture 1 to minimize chatter occurring during a machining operation. Any suitable adaptive control scheme may be used including, by example, one of those disclosed in an article entitled "Adaptive Feedback Control", Proceedings of the IEEE, vol. 75, No. 2, February, 1987, by Karl Johan Åström. Referring to FIGS. 5a and 5b, there are illustrated exemplary block diagrams of a direct adaptive control scheme 30' using estimated controller gains, and an indirect adaptive control scheme 30, respectively.

Figure 7:
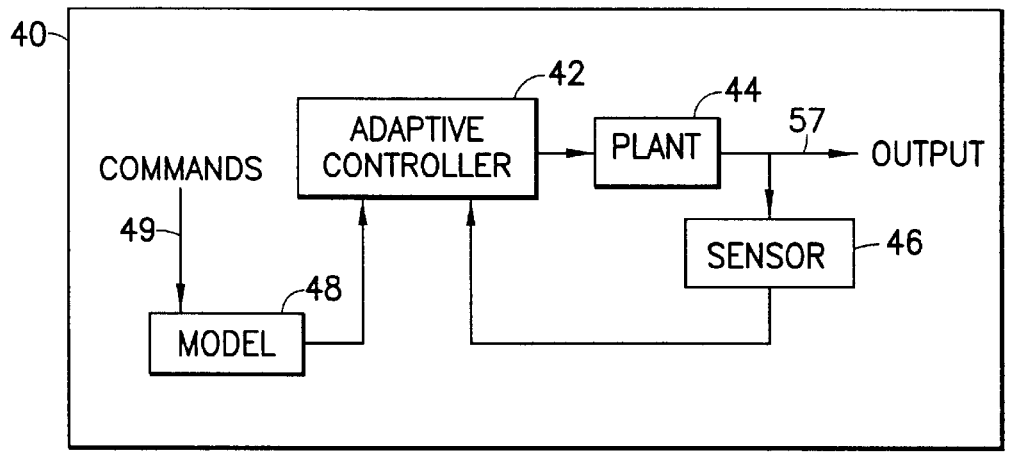
FIG. 7 is a block diagram of a direct adaptive control system that can be used as a controller in accordance with an aspect of this invention.
Figure 8:
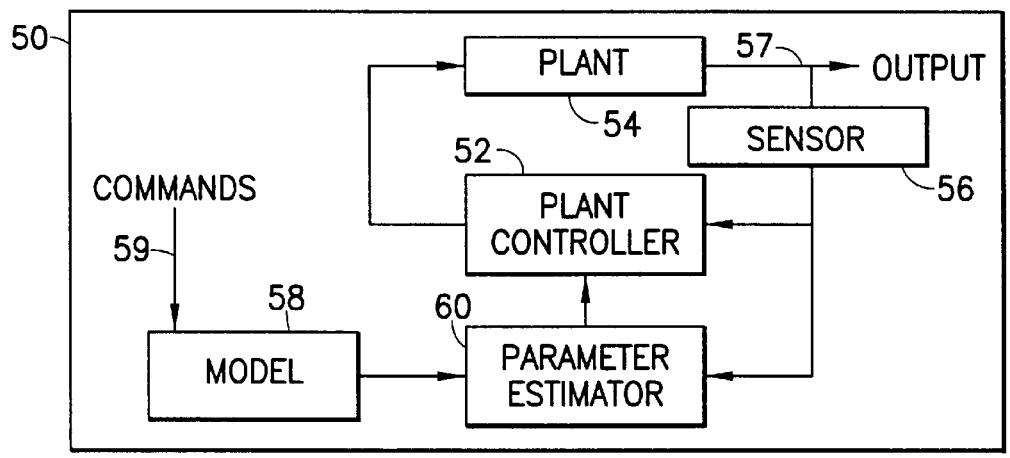
FIG. 8 is a block diagram of an indirect adaptive control system that can be used as a controller in accordance with a further aspect of this invention.

FIG. 7 and FIG. 8 illustrate block diagrams of a direct adaptive control scheme 40 and an indirect adaptive control scheme 50, respectively. In the direct adaptive control scheme 40, an output 57 of a plant 44 is detected by a sensor 46, which thereafter provides the detected plant output to an adaptive controller block 42. Within the adaptive controller block 42, the detected output is compared with a model 48 which embodies desirable system responses. These desired system responses may be predefined in accordance with commands 49 that are input to the model 48, and which specify the desired system responses. Any discrepancy between the detected output and the model 48 is used to control the plant 44 in order to minimize the discrepancy and force the plant 44 to behave like the model 48.

For a case in which the direct adaptive control scheme is used, any suitable plant controllers, such as lead-lag controllers, may be employed to regulate the performance of the control scheme. The plant may be assumed as, by example, a second-order system, or a higher-order system. System response parameters such as damping ratio, natural frequency, overshoot, etc., can be directly identified and compared to the model 48. Control gains within the controller 42 are adjusted until the output of the plant 44 measured by the sensor 46 is the same as the output of the model 48.

As can be appreciated by one skilled in the art, the output 57 of the plant 44 may also be used for other, non-control purposes. By example, the output 57 of the plant 44 may be used to derive information relating to the performance of the machining operation, such as, by example, information relating to changes in the surface finish of the workpiece 3.

For a case in which the indirect adaptive control scheme is employed, such as the one shown in FIG. 8, explicit self-tuning regulators (STRs) estimate necessary plant parameters to be used by a control design algorithm. The control scheme 50 acts as a pattern classifier whose plant output 57 updates, via a parameter estimator 60, the gains associated with the control scheme 50 such that the plant 54 is forced by the controller 52 to follow a model 58 (which embodies desirable system responses that are predefined in accordance with commands 59 input to the model 58 and specifying the desired system responses). Because of the structure of the baseline control of such a control scheme 50, both off-line and on-line training adaptation of the scheme 50 are able to occur rapidly.

FIG. 6 illustrates the control computer module 20 which employs the adaptive control scheme to control actuator 5 and actuator assembly 2 movements. The control computer module 20 comprises an analog to digital ("A/D") converter 22, a control processor 24, a digital to analog ("D/A") converter 25, and a monitor/keyboard device 26. FIG. 6 also illustrates block representations of the active fixture 1 and a multi-channel amplifier 29. The accelerometer(s) 14 and the acoustic sensors 12 are compositely represented by a sensors block 32. Also, the actuators 5 and the actuator assemblies 2 are compositely represented by an actuator block 32', and the active bed is represented by block 6.

Figure 9:
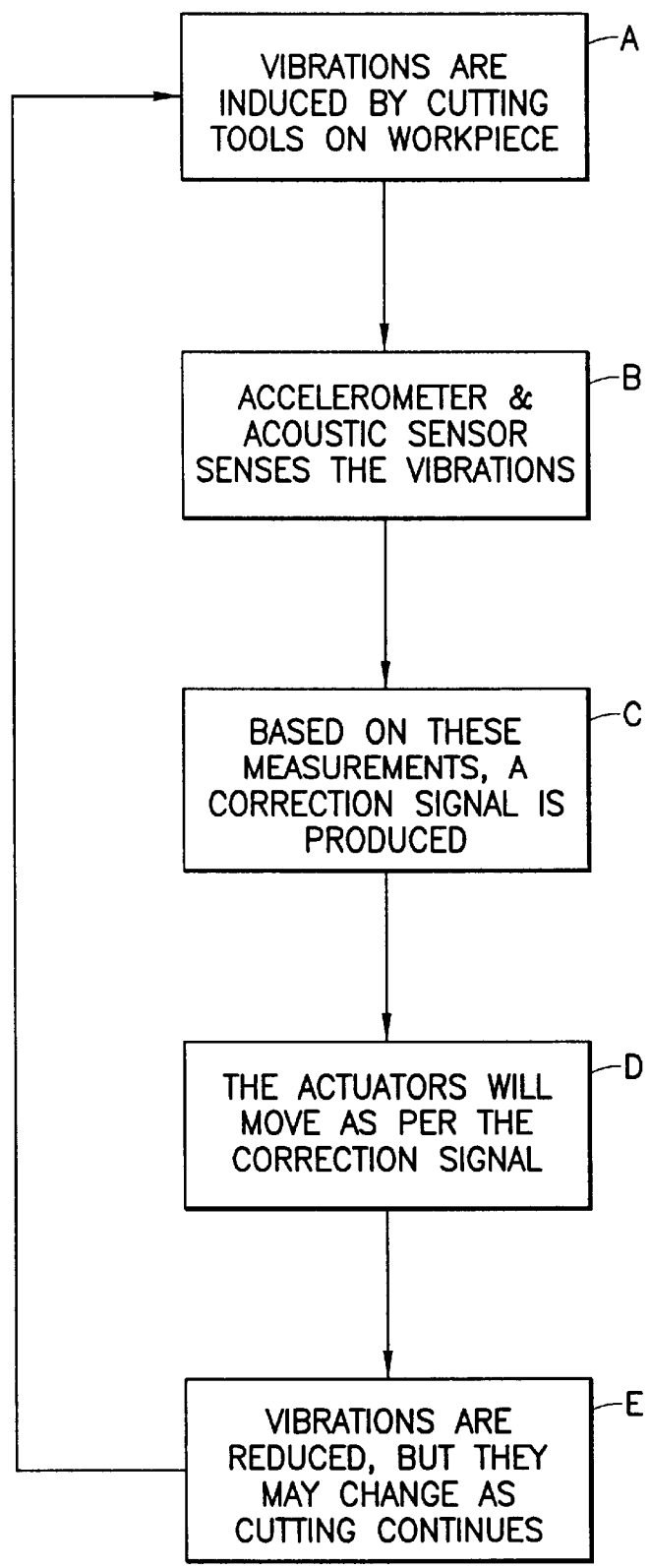
FIG. 9 illustrates a flow chart of a method in accordance with the invention, which is employed by the active fixture of FIG. 1 for adaptively controlling chatter occurring during a machining operation.

The control computer module 20 controls actuator 5 and actuator assembly 2 movements in the following manner, which may be understood in view of FIG. 6 and the flow diagram of FIG. 9. During a milling operation, the sensors block 32 detects accelerations of the active fixture 1, and/or an onset of acoustic vibrations occurring due to chatter taking place during the operation. (see blocks A and B). Upon a detection made by the sensors block 32, signals that are representative of the detected accelerations and/or acoustic vibrations are output by the sensors block 32 and are then A/D converted by block 22. After the signals are A/D converted, they are provided to the control processor 24 (this step is not shown in FIG. 9). The control processor 24 performs an integration using the signals representing these accelerations to deduce information approximating the actual position of the active bed 6.

The control processor 24 then compares (1) the information representing the approximate actual position of the active bed 6 and/or (2) the signals representing the detected vibrations to a reference parameter Yc (FIGS. 5*a* and 5*b*). The reference parameter Yc represents a reference or desired position of the active bed and/or a reference vibration level, depending upon whether both or one of the accelerometers and acoustic sensors are used for the particular application. The reference parameter Yc is predetermined, and is pre-programmed into the control processor 24 via the monitor/keyboard device 26. The programming of the reference parameter Yc into the control processor 24 is represented by the commands 49 and 59 input into the respective models 48 and 58 shown in FIGS. 7 and 8.

For a case in which the reference parameter Yc does not equal the information detected by the sensors block 32, an error signal (e) is generated that is proportional to the difference between the reference parameter Yc and the detected information (block C). The error signal (e) is indicative of chatter, and is used to derive appropriate response parameters (e.g., metrics) that are used to reposition the movable "seat" upon which the active bed 6 is supported. The response parameters are related in a non-linear manner to the error signal (e). This relationship is implicitly derived by the control processor 24 to minimize the error signal (e) using, by example, the formula d=−ρ ($\partial e/\partial t$), wherein d represents a correction signal used in the adaptive control scheme, as will be described below, ρ is the non-linear transfer function, and $\partial e/\partial t$ represents the change of the error signal (e) over time.

The response parameters define, by example, an amplitude, phase, and frequency of movement for each of the actuators 5 and actuator assemblies 2, that are required to reposition the active bed 6 for minimizing the error signal (e). The amplitude and frequency are derived based upon expected maximum chatter levels.

After the response parameters are determined, control signals (u) representing these response parameters are output by the control processor 24, D/A converted (block 25), and supplied to a multi-channel amplifier 29 which amplifies the signals to a power level that is appropriate for actuator 5 and actuator assembly 2 operation. The amplified control signals are forwarded to particular ones of the actuators 2 and the actuator assemblies 2, as is determined by the control processor 24 in order to minimize the detected accelerations and/or vibrations. After the amplified control signals are supplied to the appropriate actuators 5 and actuator assemblies 2, these actuators 5 and actuator assemblies 2 provide a force in response to receiving the control signals (block D). Preferably, the actuators 5 and actuator assemblies 2 can provide displacements that are at least as small as, for example, +/−0.0005", and frequencies of at least 1500 Hz.

The forces provided by the actuators 5 and actuator assemblies 2, and the concomitant forces provided by the contacting edges 5*a*1, 2*a*1 of the actuator and actuator assembly protrusions 5*a*, 2*a*, adjust the position of the moveable "seat" upon which the active bed 6 is situated in accordance with the response parameters specified by the control processor 24. The active bed 6 moves in accordance with the movement of the "seat", and out-of-phase motions of the work piece 3 with respect to motions of the cutter (resulting in chatter) are minimized. As a result, the amplitudes of the detected vibrations and/or accelerations are minimized (block E). In a preferred embodiment of the invention, the foregoing process is performed such that the chatter is prevented from occurring before it becomes audible to an operator of the milling machine. That is, vibrations and/or accelerations are detected and compensated for, before audible, chatter-related vibrations can be produced.

Signals received by the control processor 24 from the accelerometers 14 and/or acoustic sensors 12 are also used to estimate current dynamics of the active bed 6 (and workpiece 3) during the milling process, as changes to workpiece 3 geometry and mass occur. Such changes to the workpiece 3 are likely to be accompanied by recurring chatter. Thus, the relative position of the workpiece 3 may need to be re-adjusted in order to compensate for such vibrations. The active fixture 1, control computer module 20, and multi-channel amplifier 30, function as an active control system to dynamically adjust the workpiece position as needed to compensate for these vibrations occurring with the changes in the workpiece 3. By example, the accelerometers 14 and acoustic sensors 12 (sensors block 32) dynamically provide active feedback signals to the control computer module 20 during the machining process as changes in the workpiece 3 occur. These signals are A/D converted and thence provided to the control processor 24, which performs the same process described above in order to calculate appropriate response parameters for minimizing the chatter. In this manner, parameter response signals generated by the control computer module 20 in response to the provided feedback are dynamically updated in real time as changes in the workpiece 3 occur.

As an example of this type of dynamic feedback control for a case in which the invention employs the direct adaptive control scheme 30', signals received by the control processor 24 from the sensors blocks 32 are used to estimate the current dynamics of the active bed 6 (and workpiece 3) at estimator block 34 (FIG. 5*a*). Based upon the estimations, the estimator block provides correction signals (d) to the controller 33 to correct control signals (u) that are output by the controller 33.

As another example, for a case in which the invention employs the indirect adaptive control scheme 30 of FIG. 5*b*, the response parameters determined by the control processor 24 are adjusted with the estimator block 34 and the control design block 36. For example, an estimation of the current dynamics of the active bed 6 is performed in the same manner as described above. The control design block 36 then calculates updated response parameters (d) to govern the control signals (u) that are output by the controller 33.

For either of the examples described above, once the control processor 24 emits the control signals (u), the signals are D/A converted, amplified by the multi-channel amplifier 29, and supplied to the actuators 5 and actuator assemblies 2, in the same manner as described above. Thereafter, in response to the control signals, each of the actuators 5 and actuator assemblies 2 which received the control signals provides directional forces to the active bed 6 to cause the position of the active bed 6 to be adjusted, so as to minimize the recurring chatter vibrations.

It should be noted that the multi-channel amplifier 29 may be located physically apart from the control computer module 20 or incorporated therewithin. In a preferred embodiment of the invention, the control computer module 20 and the multi-channel amplifier 29 are located at a sufficient distance from the milling machine to prevent machining debris from harming these devices. Also in the preferred embodiment of the invention, a single cable is employed to carry wires connecting the actuators 5, actuator assemblies 2, accelerometers 14, and sensors 12, to the multi-channel amplifier 29.

In accordance with the above description, the invention provides a method for minimizing an undesirable motion of a workpiece during a machining operation. The method comprises the steps of (a) mounting the workpiece to a supporting structure, (b) machining the workpiece, (c) during the step of machining, sensing, in the supporting structure, the undesirable motion of the workpiece, and (d) generating a compensating motion in the supporting structure for minimizing the undesirable motion of the workpiece.

While the invention has been particularly shown and described with respect to preferred embodiments thereof, it will be understood by those skilled in the art that changes in form and details may be made therein without departing from the scope and spirit of the invention.

What is claimed is:

1. A method of minimizing an undesirable motion of a workpiece during a machining operation, comprising the steps of:
    mounting the workpiece to a supporting structure;
    machining the workpiece and, during the step of machining;
    sensing, in the supporting structure an undesirable motion of the workpiece, said sensing step including a step of detecting an acceleration of the supporting structure and optionally also acoustic vibrations produced as a result of the undesirable motion, and wherein said step of sensing is performed by sensing accelerations of at least one of the workpiece and the supporting structure, along the x, y, and z axes; and
    generating a compensating motion in the supporting structure for minimizing the undesirable motion of the workpiece, wherein the compensating motion is generated based on the detected acceleration and optionally also the acoustic vibrations.

2. A method of minimizing an undesirable motion of a workpiece during a machining operation as in claim 1, wherein, said undesirable movement of said workpiece, which is sensed, comprises machining chatter.

3. A universal adaptive machining chatter control process for minimizing workpiece chatter in a machine tool structure, said process comprising:
    providing an active bed device comprising, an active bed for supporting a workpiece and a base for movably supporting said active bed for movement in at least x, y and z directions, said base being adapted to be secured to said bed of said machine tool structure;
    securing a workpiece directly or indirectly to said active bed;
    sensing any undesirable movement of said workpiece in at least the x, y and z directions during machining;
    responsive to said sensing step, controlling the position of said active bed in the x, y or z directions, or any desired combination thereof, in a manner which will minimize any undesirable movement of said workpiece.

4. A method as set forth in claim 1, in which acoustic sensors are provided on the supporting structure and the method is performed to detect and minimize chatter-induced acoustic vibrations before they reach a level at which they become audible.

5. A method as set forth in claim 1, wherein the step of sensing is performed on a real-time basis and as dynamic changes occur to characteristics of the workpiece as a result of the step of machining.

6. A method as set forth in claim 1, wherein the step of sensing includes a step of producing, in response to sensing the undesirable motion of the workpiece, a signal corresponding to the undesirable motion of the workpiece; and
    wherein the step of generating includes steps of comparing the signal with a reference signal to produce an error signal, and generating the compensating motion so as to minimize a magnitude of the error signal.

7. A method as set forth in claim 1, wherein the supporting structure is secured to a separate machine tool structure, and wherein the steps of sensing and generating are performed independently of operations performed by a controller of said machine tool structure.

8. A chatter control device for a machining structure, comprising:
    means for securely supporting a workpiece;
    sensing means located in said support means, said sensing means for sensing, in said supporting means, an undesirable motion of said workpiece during a machining operation of said workpiece, said sensing means also for outputting a detection signal in response to sensing the undesirable motion of said workpiece, said detection signal corresponding to the undesired motion of said workpiece, said sensing means comprising at least one accelerometer for sensing accelerations of said workpiece along the x, y, and z axes; and
    motion generating means, coupled to an output of said sensing means, said motion generating means for generating, in response to receiving said detection signal, a compensating motion in said supporting means to minimize the undesirable motion of said workpiece.

9. A universal adaptive machining chatter control fixture as in claim 8 wherein, said undesirable movement of said workpiece, which is sensed, comprises machining chatter.

10. A chatter control device as set forth in claim 8, wherein said sensing means further comprises means for sensing acoustic vibrations resulting from said undesirable motion of said workpiece.

11. A chatter control device as set forth in claim 8, wherein said supporting means further comprises at least three corner edges, and wherein said chatter control device further comprises at least three accelerometers, each of said accelerometers being located at a respective one of the corner edges for sensing accelerations of at least one of said supporting means and said workpiece along a respective one of the x, y, and z axes.

12. A chatter control device as set forth in claim 8, wherein said supporting means comprises an active bed having an upper surface for securely supporting said workpiece, and wherein said motion generating means includes:
    a control processor, coupled to the output of said sensing means, said control processor being responsive to said detection signal for generating information representative of a position of the active bed, said control processor also for comparing the information to a predetermined reference parameter, and for generating a control signal in response to determining that said information does not equal said predetermined reference parameter, wherein said control signal specifies that said compensating motion be applied to said supporting means;

a base portion; and actuating means, said actuating means including a first portion supported in said base portion and a second portion extending from said base portion and supporting said active bed, said second portion of said actuating means for applying said compensating motion to said active bed in response to said actuating means receiving said control signal.

13. A chatter control device as set forth in claim 8, wherein said motion generating means includes a closed-loop control system having an input coupled to the output of said sensing means, said closed-loop control system being responsive to said detection signal for controlling at least one of an amplitude, phase, and frequency of said compensating motion, based on a comparison of said detection signal to a predetermined reference parameter, and wherein an output of said closed-loop control system provides information relating to said machining operation.

14. A chatter control device as set forth in claim 8, wherein said supporting means comprises means for securing said supporting means to a machine bed of a machine tool structure.

15. A chatter control device as set forth in claim 14, wherein said securing means includes at least one slot for receiving a bolt for engaging with said machine bed for securing said supporting means to said machine bed.

16. A universal adaptive machining chatter control fixture for attachment to a bed of a machine tool structure, said fixture comprising:

an active bed for supporting a workpiece and a base for movably supporting said active bed for movement in at least x, y and z directions, said base being adapted to be secured to the bed of said machine tool structure;

means for securing a workpiece directly or indirectly to said active bed;

means for sensing any undesirable movement of said workpiece in at least the x, y and z directions during machining;

actuating means for adjusting the position of said active bed in the x, y or z directions or any desired combination thereof; and control means responsive to said sensing means for controlling said actuating means in a manner which will minimize any undesirable movement of said workpiece.

17. A universal adaptive machining chatter control fixture as in claim 16 wherein, said sensing means comprises means for sensing movement of said active bed in said at least x, y and z directions.

18. A universal adaptive machining chatter control fixture as in claim 17 wherein, said control means comprises: a control processor coupled to the output of said sensing means, said control processor responsive to said sensing means, generating a signal representative of a position of said active bed, comparing said signal to a predetermined reference parameter, generating a control signal in response to the difference between said position signal and said reference parameter for application to said actuating means to provide a compensating motion to said active bed to minimize chatter of said workpiece.

19. A universal adaptive machining chatter control fixture as in claim 18 wherein, said base has an open box like shape comprising a base portion for securing to said bed of said machine structure and a wall portion arranged about a periphery of said base portion and wherein said active bed includes a first portion which is adapted to extend over said wall portion and a second portion which is adapted to extend into the opening in said base so that it is surrounded by said wall portion and wherein said actuating means are supported by said base portion and said wall portion of said base and are adapted to engage said second portion of said active bed to adjust the position of said active bed.

20. A universal adaptive machining chatter control fixture as in claim 19 wherein said wall has a rectilinear shape and said actuating means comprises means for providing a directional force responsive to an applied electrical signal from said control means.

21. A universal adaptive machining chatter control process as in claim 20 wherein, said undesirable movement of said workpiece, which is sensed, comprises machining chatter.

22. A universal adaptive machining chatter control process as in claim 20 wherein, said sensing step comprises sensing movement of said active bed in said at least x, y and z directions.

23. A universal adaptive machining chatter control fixture as in claim 16 wherein, said undesirable movement of said workpiece, which is sensed, comprises machining chatter.

* * * * *